US011688903B2

(12) United States Patent
Porras et al.

(10) Patent No.: US 11,688,903 B2
(45) Date of Patent: Jun. 27, 2023

(54) COOLING MODES TO MANAGE A HIGH VOLTAGE BATTERY FOR A VEHICLE

(71) Applicant: Ford Global Technologies, LLC, Dearborn, MI (US)

(72) Inventors: Angel Fernando Porras, Dearborn, MI (US); Mark G. Smith, Canton, MI (US); Neil Robert Burrows, White Lake Township, MI (US); Bo Wu, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 526 days.

(21) Appl. No.: 16/419,862

(22) Filed: May 22, 2019

(65) Prior Publication Data

US 2019/0273296 A1 Sep. 5, 2019

Related U.S. Application Data

(62) Division of application No. 14/721,139, filed on May 26, 2015, now abandoned.

(51) Int. Cl.

| | |
|---|---|
| ***H01M 10/613*** | (2014.01) |
| ***B60H 1/00*** | (2006.01) |
| ***H01M 10/6569*** | (2014.01) |
| ***H01M 10/635*** | (2014.01) |

(Continued)

(52) U.S. Cl.

CPC .... *H01M 10/6569* (2015.04); *B60H 1/00278* (2013.01); *H01M 10/613* (2015.04); *H01M 10/625* (2015.04); *H01M 10/635* (2015.04); *H01M 10/656* (2015.04); *B60H 2001/00307* (2013.01); *H01M 2220/20* (2013.01)

(58) Field of Classification Search

CPC ...... B60H 1/00278; B60H 2001/00307; Y02T 10/70; Y02E 60/10; B60L 58/26; H01M 10/625; H01M 10/613; H01M 10/663; H01M 10/6567; H01M 10/6568; H01M 10/633; H01M 10/6569; H01M 2220/20; H01M 10/63

See application file for complete search history.

(56) References Cited

U.S. PATENT DOCUMENTS

| | | | | |
|---|---|---|---|---|
| 2003/0127528 A1* | 7/2003 | Sabhapathy | .......... B60L 3/0023 237/12.3 B |
| 2009/0249807 A1 | 10/2009 | Nemesh et al. | |
| 2009/0317697 A1 | 12/2009 | Dogariu et al. | |

(Continued)

FOREIGN PATENT DOCUMENTS

| | | |
|---|---|---|
| CN | 101551175 A | 10/2009 |
| CN | 103407346 A | 11/2013 |

*Primary Examiner* — Imran Akram

(74) *Attorney, Agent, or Firm* — David B. Kelley; Brooks Kushman P.C.

(57) ABSTRACT

A vehicle climate control system includes a cooling system including a chiller, a coolant circuit, a refrigerant circuit, a pump, and a compressor. The coolant circuit bypasses the chiller. The refrigerant circuit incorporates the chiller. The pump is configured to move coolant through the coolant circuit. The compressor is configured to move refrigerant through the refrigerant circuit. The vehicle climate control system also includes a controller configured to, in response to a temperature of a battery exceeding a threshold while the pump is moving fluid through the coolant circuit, activate the chiller and the compressor.

4 Claims, 7 Drawing Sheets

1st Circuit = #23 on Radiator 3rd Circuit = #27 Chiller Refrig.
2nd Circuit = #25 on Chiller 4th Circuit = #29 Cabin Refrig.

(51) Int. Cl.
*H01M 10/625* (2014.01)
*H01M 10/656* (2014.01)

(56) References Cited

U.S. PATENT DOCUMENTS

2010/0009246 A1 1/2010 Maitre et al.
2011/0091750 A1* 4/2011 Claypole .......... H01M 10/6569 429/50
2012/0003515 A1* 1/2012 Eisenhour ......... H01M 10/6571 429/62
2012/0173063 A1 7/2012 Madurai Kumar et al.
2012/0327596 A1* 12/2012 Anderson-Straley ........................ H01M 10/6569 361/689
2013/0074525 A1* 3/2013 Johnston ................ B60H 1/323 62/126
2013/0175022 A1* 7/2013 King ....................... B60L 50/62 237/12.3 B
2013/0269911 A1 10/2013 Carpenter
2014/0014421 A1* 1/2014 Carpenter .......... B60H 1/00278 237/28
2014/0070013 A1 3/2014 Stanek
2014/0216709 A1 8/2014 Smith et al.
2014/0326430 A1* 11/2014 Carpenter .......... B60H 1/00278 165/41
2014/0338376 A1* 11/2014 Carpenter ............... B60L 50/51 62/115
2015/0217623 A1* 8/2015 Hatakeyama ............. B60L 1/02 429/62
2016/0031340 A1* 2/2016 Porras ................. H01M 10/625 429/62
2016/0107506 A1* 4/2016 Johnston ............ B60H 1/00278 165/202
2016/0248129 A1* 8/2016 Dunham ............. H01M 10/625
2016/0339760 A1* 11/2016 Dunn .................. H01M 10/625

* cited by examiner

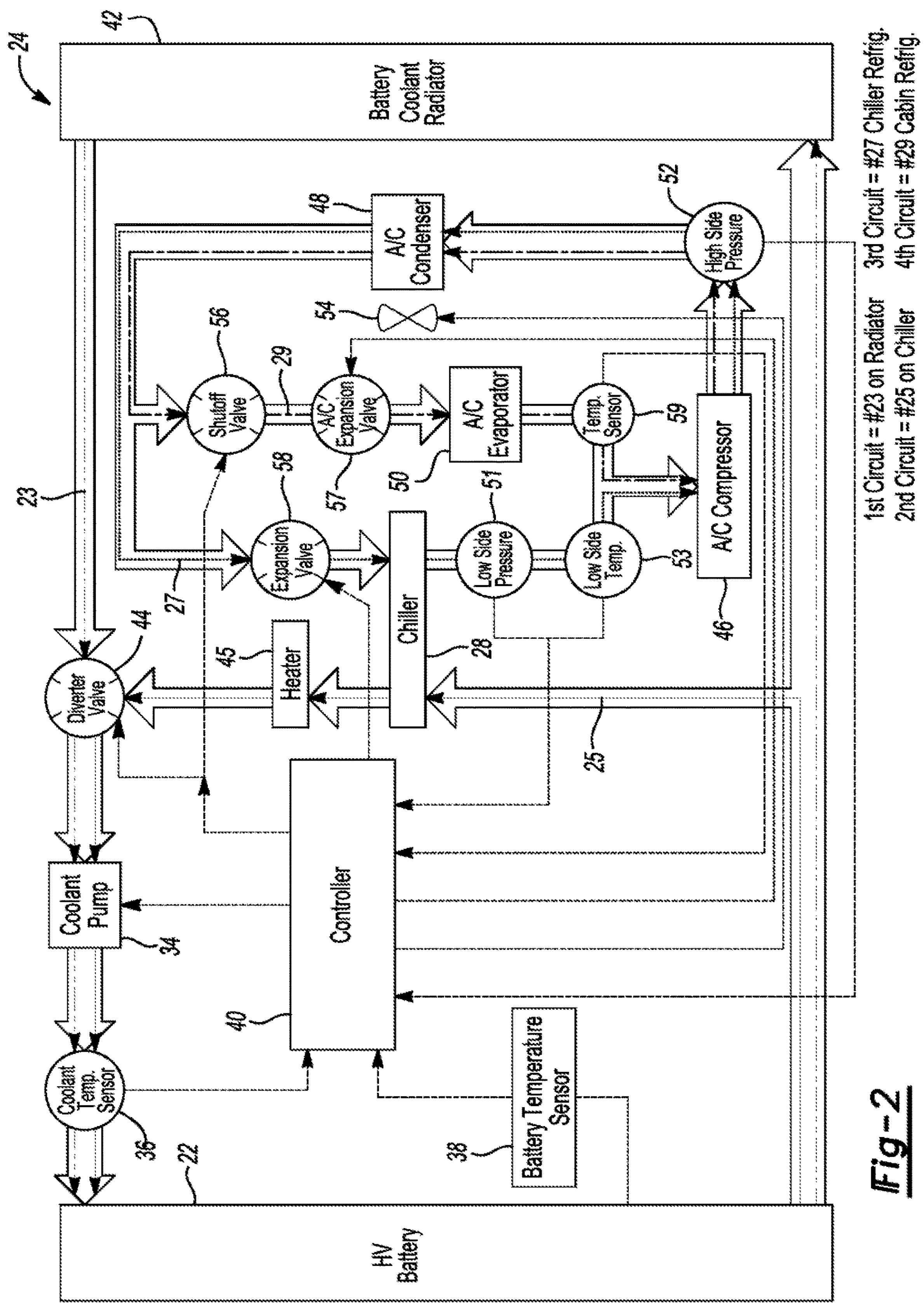
Battery Coolant Radiator
A/C Condenser
High Side Pressure
Shutoff Valve
A/C Expansion Valve
A/C Evaporator
Temp. Sensor
A/C Compressor
Expansion Valve
Chiller
Low Side Pressure
Low Side Temp.
Diverter Valve
Heater
Coolant Pump
Controller
Coolant Temp. Sensor
Battery Temperature Sensor
HV Battery
1st Circuit = #23 on Radiator
2nd Circuit = #25 on Chiller
3rd Circuit = #27 Chiller Refrig.
4th Circuit = #29 Cabin Refrig.
Fig-2

COOLING MODES TO MANAGE A HIGH VOLTAGE BATTERY FOR A VEHICLE

CROSS-REFERENCE TO RELATED APPLICATION

This application is a division of U.S. application Ser. No. 14/721,139, filed May 26, 2015, the disclosure of which is hereby incorporated in its entirety by reference herein.

TECHNICAL FIELD

The present disclosure relates to thermal management systems for electrified vehicles.

BACKGROUND

Hybrid electric vehicles and electric vehicles use a motor to propel the vehicle. Power is supplied to the motor by a battery. The battery is configured to store an electrical charge that may also be used to power other vehicle components. Efficient use of the battery allows the vehicle to be propelled by the motor. This may be achieved by using a cooling arrangement. Propelling the vehicle using a motor, powered by the battery, reduces the necessity of the vehicle to operate using an internal combustion engine. Reducing operation of the internal combustion engine increases fuel economy of the vehicle.

SUMMARY

A vehicle climate control system includes a cooling system including a chiller, a coolant circuit, a refrigerant circuit, a pump, and a compressor. The coolant circuit bypasses the chiller. The refrigerant circuit incorporates the chiller. The pump is configured to move coolant through the coolant circuit. The compressor is configured to move refrigerant through the refrigerant circuit. The vehicle climate control system also includes a controller configured to, in response to a temperature of a battery exceeding a threshold while the pump is moving fluid through the coolant circuit, activate the chiller and the compressor.

A thermal management method includes, in response to a temperature of a battery exceeding a threshold while a pump moves coolant through a coolant circuit that bypasses a chiller, altering an activation state of valving such that the coolant circuit incorporates the chiller. The thermal management method also includes, in response to a temperature of a battery exceeding a threshold while a pump moves coolant through a coolant circuit that bypasses a chiller, activating the chiller while a compressor moves refrigerant through a refrigerant circuit that also incorporates the chiller.

A vehicle includes a traction battery, a thermal management system, and a controller. The thermal management system includes a radiator, chiller, valve, and pump configured to move coolant through a coolant circuit selectively incorporating one of the radiator and chiller based on a position of the valve. The controller is configured to, in response to a temperature of the coolant traversing a threshold resulting in a battery temperature adjustment demand while the position of the valve is such that the coolant circuit incorporates the radiator and bypasses the chiller, re-position the valve such that the coolant circuit bypasses the radiator and incorporates the chiller.

BRIEF DESCRIPTION OF THE DRAWINGS

FIG. 2 is a fluid circuit diagram depicting flow of coolant and refrigerant through a battery chiller and cabin evaporator;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
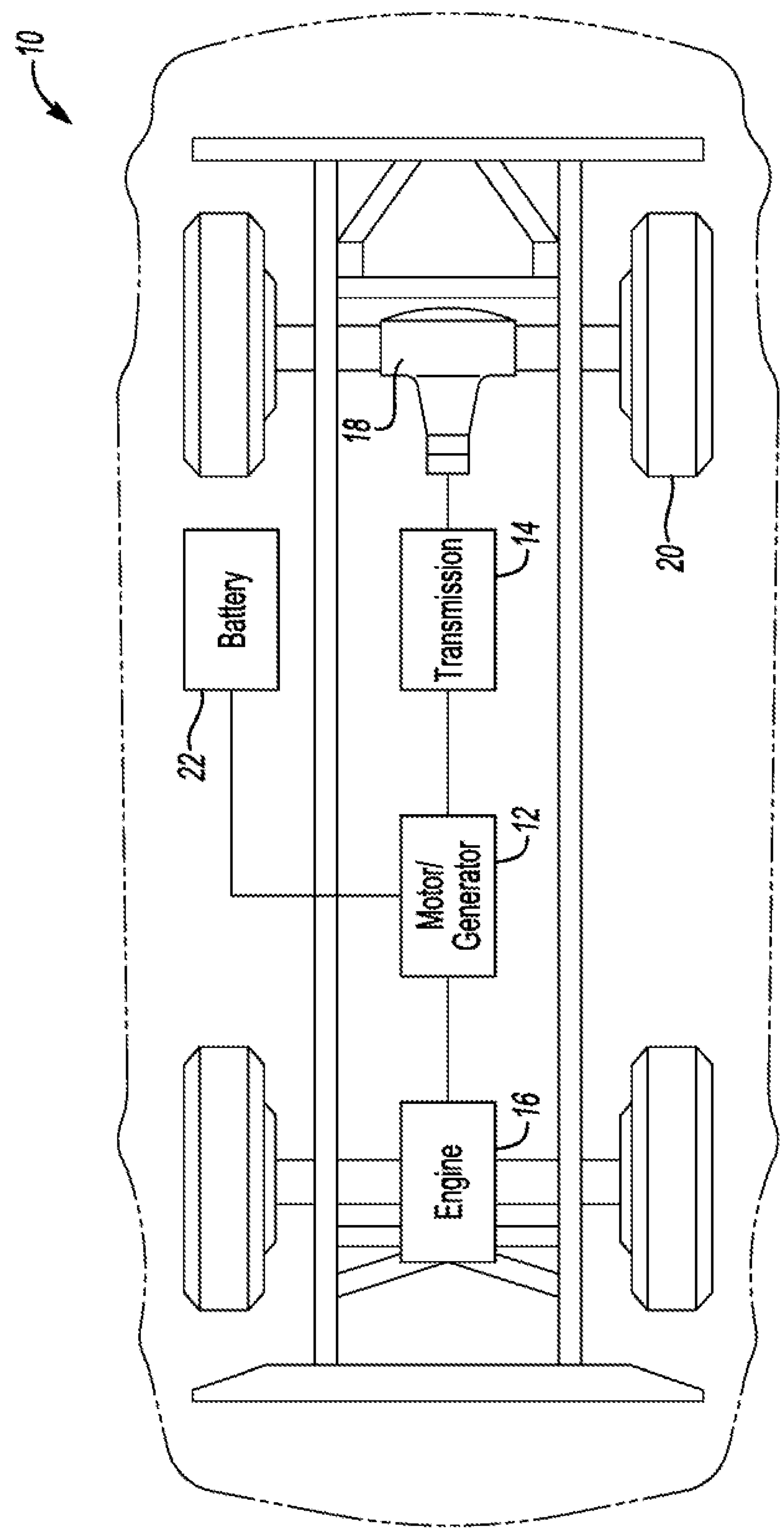
FIG. 1 is a schematic view of an electric vehicle.

FIG. 1 depicts a schematic of a typical hybrid-electric vehicle 10. Certain embodiments, however, may also be implemented within the context of plug-in hybrids and fully electric vehicles. The vehicle 10 includes one or more electric machines 12 mechanically connected to a hybrid transmission 14. In at least one embodiment, a single electric machine 12 may be mechanically connected to the hybrid transmission 14. The electric machine 12 may be capable of operating as a motor or a generator. In addition, the hybrid transmission 14 may be mechanically connected to an engine 16. The hybrid transmission 14 may also be mechanically connected to a drive shaft 18 that is mechanically connected to the wheels 20. The electric machine 12 can provide propulsion through the drive shaft 18 to the wheels 20 and deceleration capability when the engine 16 is turned on or off. The electric machine 12 also acts as a generator and can provide fuel economy benefits by recovering energy through regenerative braking. The electric machine 12 reduces pollutant emissions and increases fuel economy by reducing the work load of the engine 16.

A traction battery or battery pack 22 stores energy that can be used by the electric machine 12. The traction battery 22 typically provides a high voltage direct current (DC) output from one or more battery cell arrays, sometimes referred to as battery cell stacks, within the traction battery 22. The battery cell arrays may include one or more battery cells.

Propulsion using the electric machine 12 requires power from the battery 22. Supplying power to the electric machine 12 causes the battery 22 to generate thermal energy. Thermal energy, in the form of heat, may degrade the charge stored within the battery 22. Charging the battery 22 may also generate thermal energy degrading the battery 22. This reduces the length of time the vehicle 10 may be propelled using the electric machine 12. Electrified vehicles high voltage batteries require active thermal management to ensure full battery useful life, permit a proper charge, and meet vehicle driving performance attributes. It is not only durability but also keeping the battery below a temperature threshold allows the vehicle to be driven without battery power limits. In other words, battery temperature can limit electric vehicle drive performance. Hybrid vehicles usually supplement this torque hold and run the engine to make up the difference. Therefore, it may be advantageous to cool the battery 22. Cooling the battery may dissipate thermal energy from the battery 22 and increase efficiency of the power transfer from the battery 22 to the electric machine 12. This would allow the electric machine to propel the vehicle 10 for a longer period of time and reduce a period of time the vehicle is propelled by the engine 16. Likewise, it may be advantageous to heat the battery 22 when the battery 22 is too cold.

The various components discussed may have one or more associated controllers to control and monitor the operation of the components. The controllers may communicate via serial bus (e.g., Controller Area Network (CAN)) or via dedicated electrical conduits.

FIG. 2 depicts a fluid circuit diagram for a cooling system 24 used to cool the battery 22. The cooling system 24 uses a refrigerant and a coolant in different thermal circuits to optimize battery 22 performance. A first thermal circuit 23 and second thermal circuit 25 may be used to control the temperature of the coolant. A third thermal circuit 27 and fourth thermal circuit 29 may be used to control the temperature of a refrigerant. The third thermal circuit 27 may also be used to optimize the temperature of both the coolant and the refrigerant. The coolant may be a conventional coolant mixture, such as water and ethylene glycol. The refrigerant may be a conventional refrigerant, such as R **134*a* or 1234*yf*. The third 27 and fourth 29** circuits could run simultaneously when cabin and battery thermal management is required.

The first thermal circuit 23 and the second thermal circuit 25 may include a coolant pump 34, the battery 22, a radiator 42, a chiller 28, and a diverter valve 44. The pump 34 is used to circulate the coolant through the first thermal circuit 23 and the second thermal circuit 25. The pump 34 pumps the coolant to the battery 22. The coolant may pass a coolant temperature sensor 36 before interacting with the battery 22 to monitor the temperature of the coolant. A battery temperature sensor 38 may be used to monitor the temperature of the battery 22.

A controller 40, or control module communicates with the coolant temperature sensor 36 and the battery temperature sensor 38 to optimally control the flow of the coolant through the first and second thermal circuits 23, 25 based on temperature demands of the battery 22. In at least one other embodiment, the controller may communicate with a plurality of temperature sensors 38. The coolant interacts with the battery 22 to absorb heat from the battery 22. The warmed coolant from the battery 22 is pumped into the radiator 42 through the first thermal circuit 23. The radiator 42 cools the warmed coolant using ambient air flowing across the radiator 42. The radiator 42 allows the coolant to dissipate the thermal energy absorbed from the battery 22 and be cycled back to the battery 22 for further cooling.

The diverter valve 44 may be used to regulate the flow of the coolant from the radiator 42. If an ambient temperature is above a predefined threshold value or the battery temperature is above a predefined battery temperature threshold, then the radiator 42 may not provide sufficient cooling to the coolant to meet battery cooling demands. The diverter valve 44 may be actuated by the controller 40 to retard coolant flow from the radiator 42 when the ambient temperature is above the threshold. When actuated, the diverter valve 44 forces the coolant to be pumped by the pump 34 through the chiller 28 in the second thermal circuit 25. For example, after absorbing thermal energy from the battery 22 the coolant may also be cycled through the chiller 28 to sufficiently cool the coolant to meet battery cooling demands. The same cooling circuit may be used to warm the battery 22 with or without a heater 45. This cooling circuit may also be used to balance out the temperatures across the battery 22.

The third and fourth thermal circuits 27, 29 may include a compressor 46, a condenser 48, a chiller 28, and an evaporator 50. The compressor 46 pressurizes and circulates the refrigerant through the third and fourth fluid circuits 27, 29. A pressure sensor 51 and temperature sensor 53 determine the pressure and temperature of the refrigerant necessary to measure a superheat value of the refrigerant. Another pressure sensor 52 may monitor a pressure of the refrigerant as it passes from the compressor 46 to the condenser 48 to determine a pressure ratio of the refrigerant based on the pressure from pressure sensor 51. The compressor 46 circulates the refrigerant to the condenser 48. The condenser 48 may include a fan 54. The condenser 48 is configured to condense the refrigerant from a gas to a liquid to further cool the refrigerant. If the refrigerant pressure is above a predefined threshold, then the controller 40 may activate the fan 54. The fan 54, in conjunction with grille shutters (not shown), aids to further dissipate thermal energy from the refrigerant.

The refrigerant may be circulated within the fourth thermal circuit 29 based on a demand from the evaporator 50. The condenser 48 in conjunction with the fan 54 aids to dissipate heat absorbed by the refrigerant in the fourth thermal circuit 29 to meet the demand of the evaporator 50. Before entering the evaporator 50, the refrigerant flows through a first expansion valve 57. The first expansion valve 57 may be an electronic expansion valve actively controlled by the controller 40. An additional temperature sensor 59 is used with the expansion vale 57 to regulate the flow of refrigerant through the evaporator 50. In at least one other embodiment, the first expansion valve 57 may be a passive thermal expansion valve. A refrigerant shut off valve 56 may be used to shut off refrigerant flow through the fourth thermal circuit 29. The refrigerant shut off valve 56 may also be used to allow refrigerant flow through the evaporator 50. When the refrigerant shut off valve allows refrigerant flow through the evaporator 50, refrigerant flows through both the third 27 and the fourth 29 thermal circuits provided that electric expansion valve 58 is open.

The third thermal circuit 27 may additionally include the chiller 28 and a second expansion valve 58. The chiller 28 may also be configured to effectuate a heat transfer of the refrigerant. The refrigerant shut off valve 56 only blocks refrigerant flow to the evaporator 50. To allow refrigerant flow through the chiller 28, only expansion valve 58 needs to open. The second expansion valve 58 may be an electronic expansion valve actively controlled by the controller 40. In at least one other embodiment, the second expansion valve 58 may be a passive thermal expansion valve. The second expansion valve 58 is configured to change the flow of the refrigerant based on the demand of the chiller 28. The refrigerant, passing through the chiller 28, transfers heat with the coolant to further aid to dissipate the thermal energy generated from operation of the battery 22.

The chiller 28 may also be in fluid connection with a heater 45. The heater 45 is configured to warm the coolant. This allows the thermal management system 24 to provide heating as well as cooling to the battery 22. The thermal management system 24 determines whether the battery 22 requires heating. If the battery 22 requires heating, the thermal management system 24 uses a plurality of heating levels to meet the demand from the battery 22. Therefore, the thermal management system 24 may be a thermal management cooling system 24 or a thermal management heating system 24.

When the coolant is pumped through the chiller 28 because the diverter valve 44 has been actuated, the refrigerant may aid to absorb thermal energy from the coolant in the chiller 28. This is consistent with an active cooling system. Active cooling via heat transfer from the coolant to the refrigerant allows further optimization of the battery temperature. Therefore, the third thermal circuit 27 incorporates the chiller 28 and the compressor 46 through the second expansion valve 58.

The controller 40 may implement control logic described below in order to optimize cooling within the chiller 28 and the evaporator 50. While schematically illustrated as a single module in the illustrated embodiment, the controller 40 may be part of a larger control system and may be controlled by various other controllers throughout the vehicle, such as but not limited to, a vehicle system controller that includes a battery energy control module.

Figure 3:
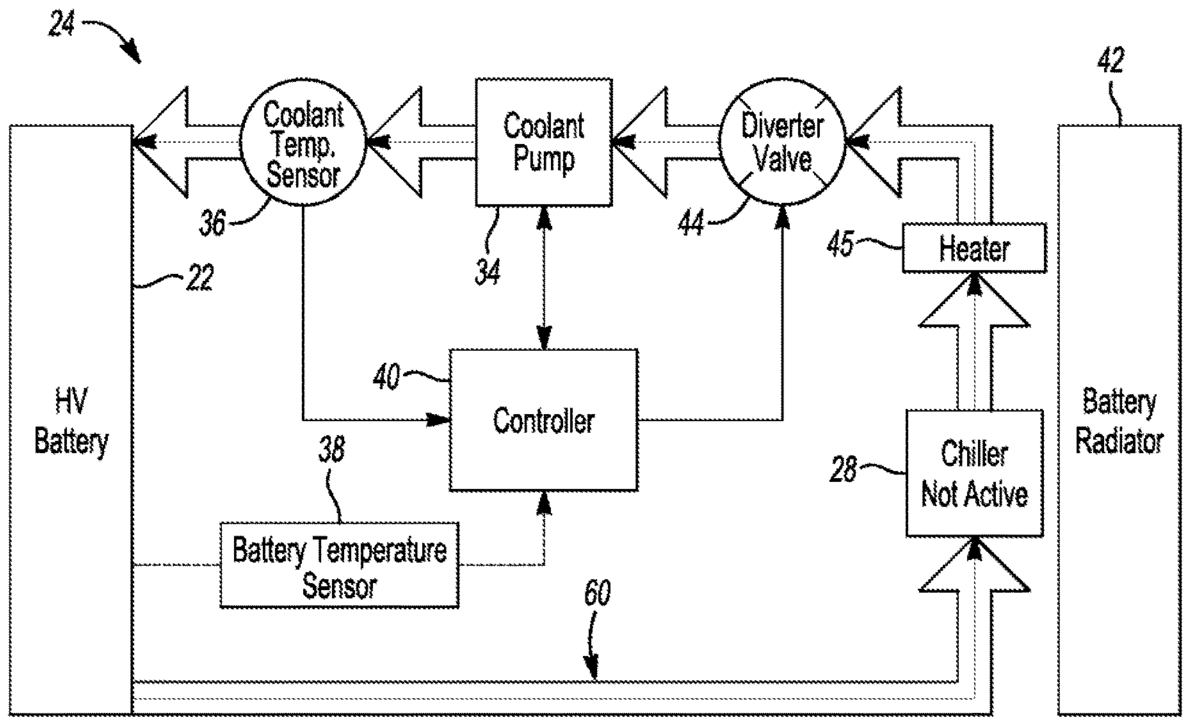
FIG. 3 is a fluid circuit diagram depicting operation of a first cooling mode for an electric vehicle battery.

FIG. 3 depicts a fluid circuit representative of a first cooling mode 60 for the thermal management system 24. The first cooling mode 60 activates the pump 34 and the diverter valve 44. The pump 34 pumps the coolant through the second thermal circuit 25 to the battery 22. Energizing the diverter valve 44 forces the coolant to flow through the chiller 28. The chiller 28 is not active in the first cooling mode 60. The coolant is not actively being cooled when the chiller 28 is not active. In the first cooling mode 60 the battery temperatures are above a first threshold requiring minimal cooling. Therefore, the coolant does not need to be actively cooled by the chiller 28 in order to meet the cooling demands of the battery 22. Energizing the diverter valve 44 and pumping coolant through the chiller 28 ensures the coolant does not overly cool the battery 22. The goal of this cooling mode is to maintain homogeneous battery cell temperatures.

The passive cooling of the radiator 42 may effectuate a heat transfer with the coolant in excess of the cooling demand of the battery 22. The coolant temperature sensor 36 and the battery temperature 38 may indicate a battery temperature below an optimum threshold to the controller 40. The controller 40 may then unnecessarily activate the heater 45. This may require more energy to control the temperature of the battery 22. Energizing the diverter valve 44 and directing the coolant through the inactive chiller 28 aids to further control the temperature of the coolant within the first cooling mode 60.

Figure 4:
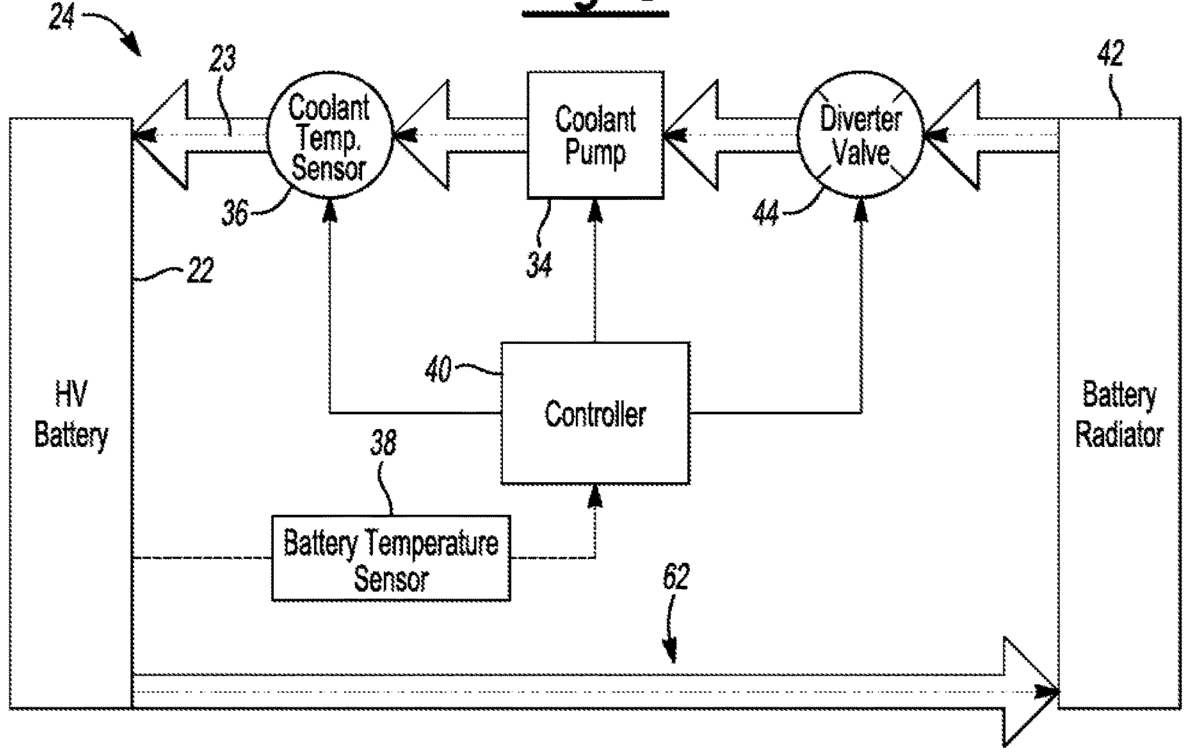
FIG. 4 is a fluid circuit diagram depicting operation of a second cooling mode for an electric vehicle battery.

FIG. 4 depicts a fluid circuit representative of a second cooling mode 62 for the thermal management system 24. The second cooling mode 62 is activated when the battery temperature sensor 38 indicates to the controller 40 that the battery temperature is above a second threshold. The second threshold is greater than the first threshold requiring more cooling than battery temperatures within the first threshold. The second cooling mode 62 is consistent with passive cooling through the first thermal circuit 23. For example, the pump 34 pumps the coolant through the radiator 42. The radiator 42 effectuates a heat transfer with the ambient air in order to meet the cooling demands the battery 22. The passive cooling technique of the second cooling mode 62 may be dependent on the temperature of the battery 22, the temperature of the coolant, and the ambient temperature through the radiator 42. The second cooling mode 62 may be advantageous because it is a passive cooling mode. Passive cooling through the radiator 42 requires very little energy to cool the battery 22. This aids to increase the efficiency of the battery 22 as well as to increase fuel efficiency of the vehicle 10. However, if the coolant temperature sensor 36 and the battery temperature sensor 38 indicate that the temperature of the battery 22 or the temperature of the coolant are above a threshold such that the heat exchange between the coolant and the ambient temperature within the radiator 42 are not sufficient to meet the cooling demands of the battery, the controller 40 may activate another cooling mode.

Figure 5:
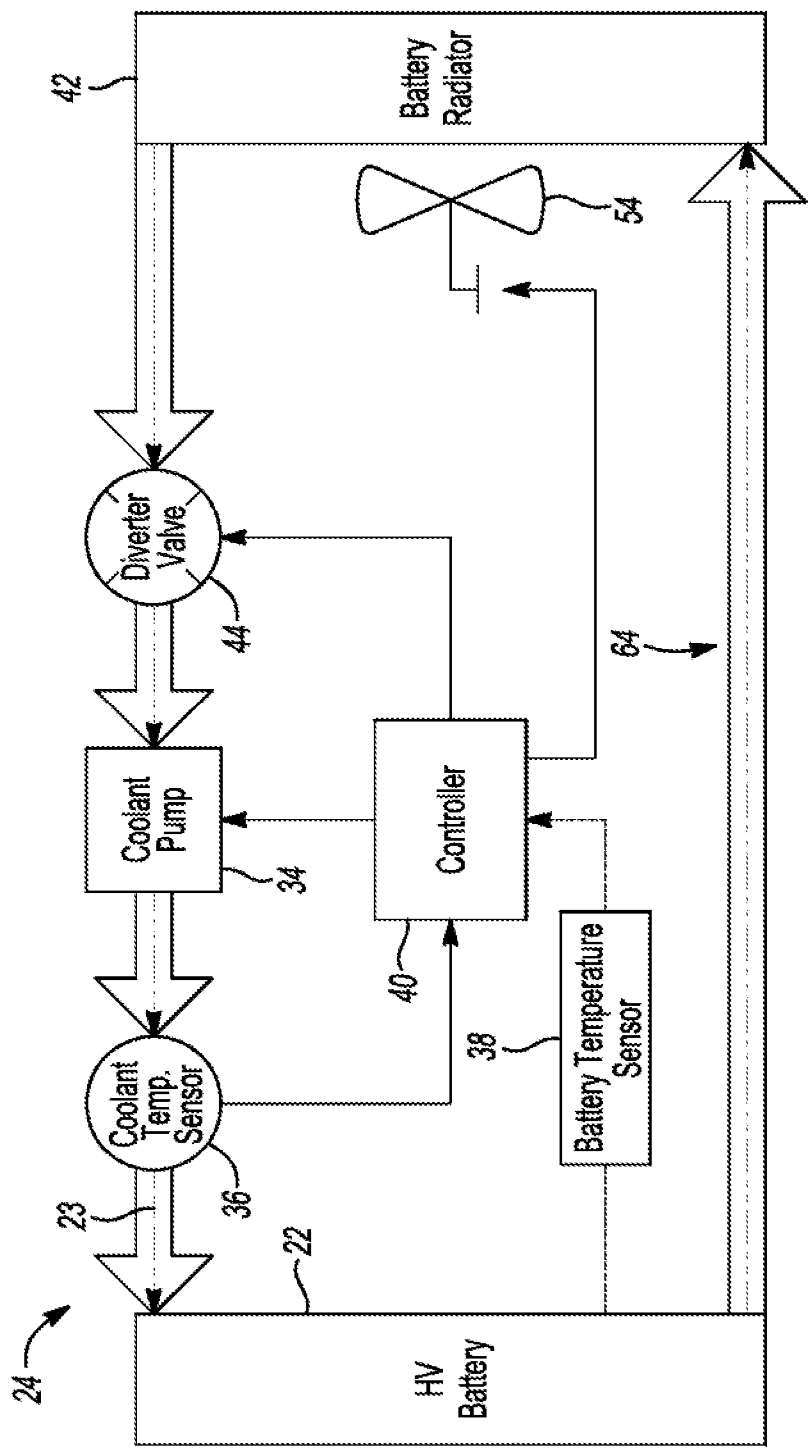
FIG. 5 is a fluid circuit diagram depicting operation of a third cooling mode for an electric vehicle battery.

FIG. 5 depicts a fluid circuit representative of a third cooling mode 64 for the thermal management system 24. The third cooling mode 64 is activated when the battery temperature sensor 38 or the coolant temperature sensor 36 indicates to the controller 40 that the battery temperature is above a third threshold. The third threshold is greater than the second threshold requiring more cooling to the battery 22. The third cooling mode 64 uses an active thermal management cooling system 24 and pumps coolant through the first thermal circuit 23.

The diverter valve 44 is not active and the pump 34 pumps the coolant through the radiator 42. However, the radiator 42 may not provide sufficient cooling to meet the cooling demand for the battery 22. The increased cooling demand may be due to an increased ambient temperature, and increase coolant temperature, or increased battery temperature. The controller 40 activates fan 54, which may also be attached with the radiator 42. The fan 54 circulates air across the radiator 42. The fan 54 effectuates heat transfer between the radiator 42 and the coolant to further reduce the temperature of the coolant. The fan 54 requires very little power to achieve the further cooling demands of the battery 22. Using minimal power to meet the cooling demand from the battery 22 is again advantageous because it improves the efficiency of the battery 22 in the overall fuel economy of the vehicle 10.

Figure 6:
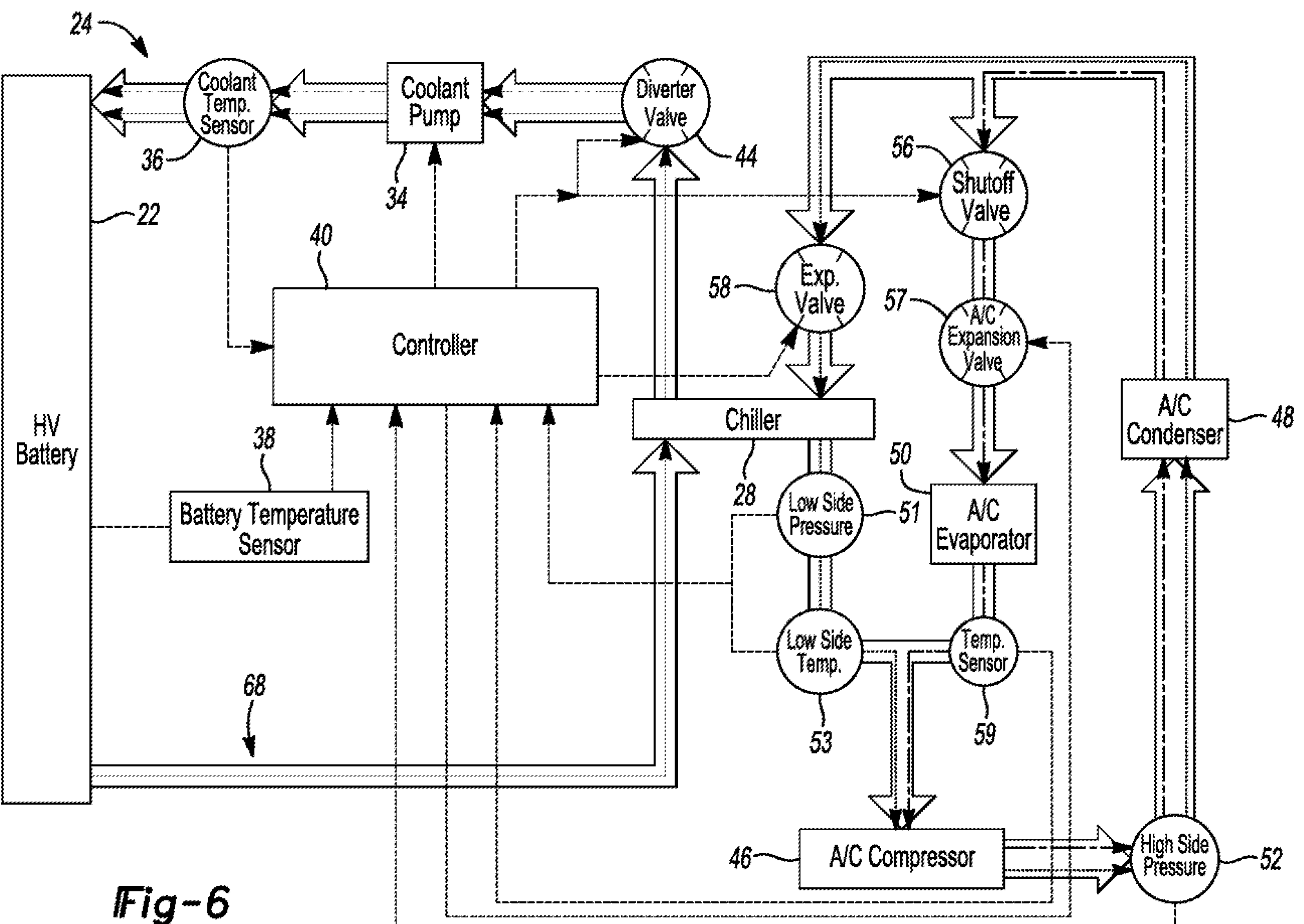
FIG. 6 is a fluid circuit diagram depicting operation of a fourth cooling mode for an electric vehicle battery.

FIG. 6 depicts a fluid circuit representative of a fourth cooling mode 68 of the thermal management system 24. The fourth cooling mode 68 is activated when the battery temperature sensor 38 indicates to the controller 40 that the battery temperature is above a fourth threshold. The fourth threshold is greater than the third threshold again requiring more cooling to the battery 22. The fourth cooling mode 68 prevents the battery 22 from being in a power-limited state. The fourth cooling mode 68 uses an active thermal management cooling system 24 to meet the increased cooling demands of the battery 22. The active thermal management system 24 pumps coolant through the second thermal circuit 25 configuration discussed above wherein the coolant for the battery 22 may exchange thermal energy with the refrigerant within the chiller 28. The refrigerant in this cooling mode 68 is flowing as described previously in the third thermal circuit 27 The fourth cooling mode 68 requires energy in order to meet the cooling demands of the battery 22 and provide efficient use of the battery 22. Meeting the cooling demands of the battery 22 allows the thermal management system 24 to operate the vehicle using the battery 22 as the sole motive force for the vehicle. Extending the use of the battery 22 may decrease fuel consumption of the vehicle and provides better overall fuel efficiency of the vehicle. The thermal management system 24 still aids to increase the overall fuel economy of the vehicle through reducing the overall temperature of the battery 22.

The controller 40 energizes the diverter valve 44 which forces the coolant through the chiller 28. The chiller 28 is active in order to meet the cooling demands of the battery 22. However, within the fourth cooling mode 68 the battery temperature is such that the controller 40 prioritizes cooling to the evaporator 50. If there is a demand for cooling to the evaporator 50, the controller 40 may activate the shut off valve 56 directing the refrigerant to flow into the evaporator 50. If the demand for cooling to the chiller 28 is present, the controller 40 may activate the expansion valve 58 to allow the refrigerant to flow through the chiller 28. Forcing the refrigerant to flow through the chiller 28 transfers thermal energy from the coolant to the refrigerant within the chiller 28. The transfer of thermal energy aids to further regulate the temperature of the coolant flowing from the chiller 28 and to the battery 22.

Figure 7:
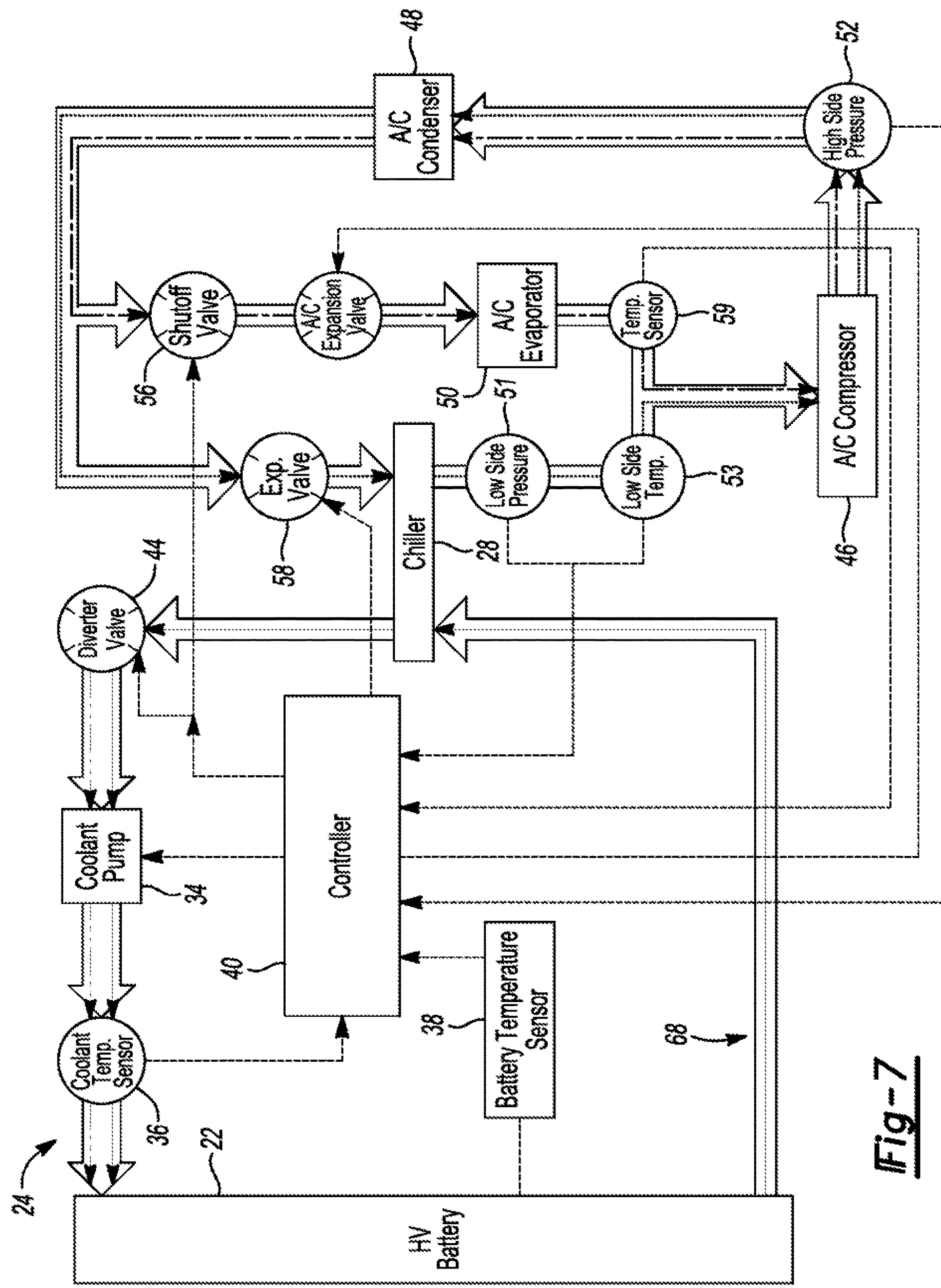
FIG. 7 is a fluid circuit diagram depicting operation of a fifth cooling mode for an electric vehicle battery.

FIG. 7 depicts a fluid circuit representative of a fifth cooling mode 70 of the thermal management system 24. The fifth cooling mode 70 is activated when the battery temperature sensor 38 indicates to the controller 40 that the battery temperature is above a fifth threshold or when only the battery needs cooling. The fifth threshold is greater than the fourth threshold requiring a large amount of cooling. The fifth cooling mode 70 is consistent with an active thermal management system 24. The fifth cooling mode 70 uses the third thermal circuit 27 to achieve cooling to the battery 22. The battery 22 may be in a critical or limited use state when the battery temperatures are high enough to activate the fifth cooling mode 70.

The thermal management system 24 biases cooling to the battery 22 when the battery 22 is in a critical condition. Biasing cooling to the battery 22 prevents degradation of the battery 22. Preventing degradation of the battery 22 aids to ensure optimal use of the battery 22. For example, the excessive thermal energy from the power discharge of the battery 22 may damage the battery structure in the critical use state, or fifth cooling mode. This may prevent the battery 22 from operating appropriately efficiently during future use. When the battery is in the limited use state, the thermal management system 24 turns off refrigerant flow through the cabin evaporator, despite the presence of a cabin cooling request.

Figure 8:
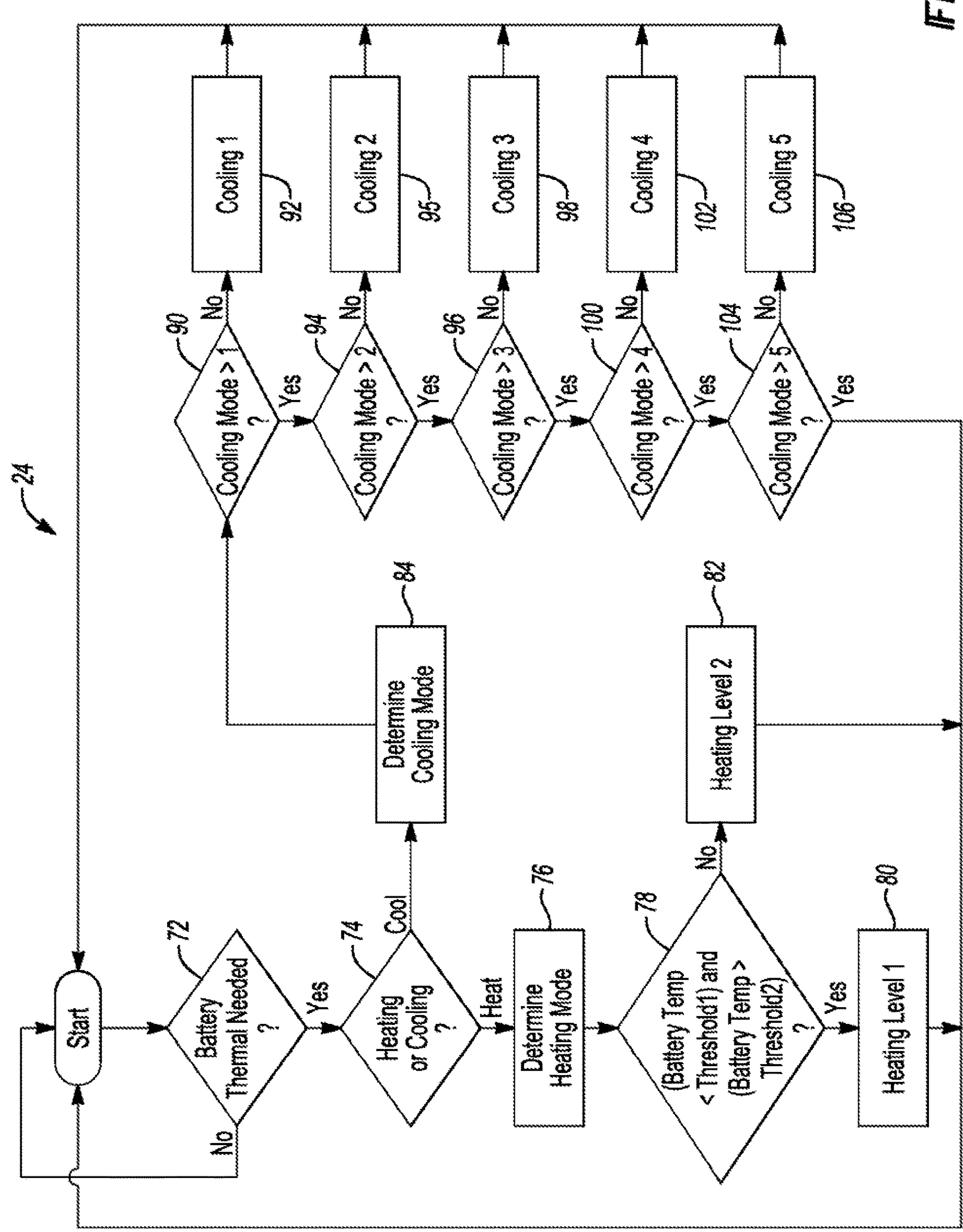
FIG. 8 is a control logic flow diagram depicting operation of the cooling system.

FIG. 8 depicts a control logic flow diagram for the thermal management system 24. The control steps are implemented by the controller 40 to determine the appropriate cooling mode configuration for the battery. At 72, the controller 40 determines if the battery needs thermal management. For example, signals from the battery temperature sensor may indicate a rise in the temperature of the battery. If at 72, a change in battery temperature indicates to the controller 40 that the battery requires thermal management, at 74 the controller 40 determines whether the battery requires heating or cooling. At 74, the controller 40 may determine battery heating is required and moves to heating mode determination at 76. Using the temperature data from the battery temperature sensor, the controller 40 calculates the appropriate heating level at 78.

In order to determine the appropriate heating mode at 78, the controller 40 compares battery temperature thresholds and the battery temperature sensor. For example, if at 78, the battery temperature falls between two predefined temperature thresholds; the controller 40 operates at the first heating level at 80 to heat the battery. If at 78, the battery temperature does not fall between the two predefined temperature thresholds, the controller 40 operates at the second heating level at 82 to heat the battery.

At 74, the controller may determine battery cooling is required. The controller 40 uses the temperature data from the battery temperature sensor to calculate the appropriate cooling mode to ensure efficient use of the battery. For example, at 84 the controller 40 determines what type of cooling mode needs to be activated. If at 84 the controller 40 determines that the battery cooling required is greater than an initial cooling mode, the controller 40 may request a different cooling mode when the battery temperature is greater than the first threshold for the first cooling mode.

If at 84 the battery temperature data indicates that the battery temperature is not greater than the cooling achieved using the first cooling mode, the controller 40 indicates that the first cooling mode is needed. The decision at 84 to determine the cooling mode is primarily a function of battery coolant temperature, battery cooling modes, and ambient air temperature. At 90, the controller 40 determines if the decision from 84 is the first cooling mode. If at 90, the first cooling mode is the appropriate cooling mode; at 92 the controller 40 actuates actuators necessary to enable the first cooling mode, as described above. If at 84 the battery temperature data indicates that the battery temperature is greater than the cooling achieved using the first cooling mode, the controller 40 determines at 84 if the second cooling mode at 94 will achieve the battery cooling demand. If at 94 the second cooling mode provides enough cooling to meet the demand the battery, the controller 40 may activate the actuators necessary to achieve the second cooling mode at 95. If at 84 the temperature of the battery indicated by the battery temperature sensor is greater than the cooling achieved using the second cooling mode, the controller may determine at 84 the third cooling mode at 96 is the appropriate mode to meet the demand of the battery 22.

At 84, the controller 40 may use the temperature data of the battery from the battery temperature sensor to determine if activation of the third cooling mode will sufficiently cool the battery. If the cooling demand of the battery is not greater than the cooling achieved using the third cooling mode configuration, at 96 the controller 40 may activate the actuators necessary for the third cooling mode at 98. If the cooling demand of the battery is greater than the cooling achieved using the third cooling mode, the controller at 84 may determine if the fourth cooling mode at 100 is sufficient to meet the demand from the battery 22.

At 84, the controller 40 analyzes whether the cooling provided by the fourth cooling mode will be sufficient to meet the cooling demand of the battery 22. If the cooling demand of the battery is less than the cooling provided through the fourth cooling mode, at 100 the controller 40 will activate the actuators necessary to enable the fourth cooling mode at 102. If at 84, the controller 40 calculates that the cooling provided to the fourth cooling mode is less than the cooling demand of the battery 22, the controller 40 may determine at 84 that the fifth cooling mode may be sufficient to achieve the cooling demand of the battery. The controller 40 may evaluate, at 84, the battery thermal conditions as being at a critically high temperature requiring limited use. Therefore, at 104 the controller 40 may activate the actuators necessary to enable the fifth cooling mode at 106 to bias cooling to the battery.

FIG. 8 also depicts the basic control logic for the thermal management system 24. The controller 40 evaluates if a certain cooling mode will achieve the cooling demand of the battery 22. The cooling provided by the cooling modes may depend on external factors, such as the ambient temperature, whether the vehicle is moving, and the demand for cooling to the cabin. For example, if the ambient temperature is very low, then the controller 40 may only command that the first cooling mode is sufficient to meet the total cooling demand of the battery. Likewise, if the ambient temperature is very hot, the controller may only command the fifth cooling mode. The thermal management system 24 considers other factors besides battery temperature, such as the ambient temperature to allow the thermal management system 24 to account for various driving conditions.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:

a traction battery;

a thermal management system including:

a coolant circuit comprising a radiator, a chiller, a first valve, and a pump configured to move coolant through the coolant circuit by selectively incorporating one of the radiator and chiller based on a position of the first valve, and a refrigerant circuit comprising the chiller, an evaporator, a condenser, a second valve, a third valve, and a compressor configured to move refrigerant through the refrigerant circuit by selectively incorporating one of the chiller and evaporator based on positions of the second and third valves;

and a controller programmed to:

in response to a temperature of the coolant traversing a threshold resulting in a battery temperature adjustment demand while the position of the first valve is such that the coolant circuit incorporates the radiator and bypasses the chiller, re-positioning the first valve such that the coolant circuit bypasses the radiator and incorporates the chiller, and in response to the temperature exceeding another threshold resulting in a battery temperature adjustment demand while the position of the second and third valves is such that the refrigerant circuit incorporates the evaporator and bypasses the chiller, re-positioning the second and third valves such that the refrigerant circuit bypasses the evaporator and incorporates the chiller.

2. The vehicle of claim 1, wherein the controller is further programmed to position the third valve to incorporate the chiller and evaporator in the refrigerant circuit while the coolant moves through the coolant circuit based on a cabin temperature adjustment demand.

3. The vehicle of claim 2, wherein the controller is further programmed to, in response to the temperature of the coolant exceeding another threshold resulting in a cabin temperature adjustment demand while the refrigerant moves through the refrigerant circuit and the position of the second valve is such that the refrigerant circuit bypasses the evaporator and incorporates the chiller, alter a position of the second valve to incorporate the evaporator in the refrigerant circuit.

4. The vehicle of claim 2, wherein the controller is further programmed to, in response to the temperature of the coolant traversing the threshold, modulate a position of the third valve to adjust cooling capacity of the chiller.

* * * * *